July 19, 1960

W. BUNKER 2,945,547

ENGINE AND VEHICLE SPEED CONTROL GOVERNOR

Filed June 12, 1957

INVENTOR
Ward Bunker
BY
L.D. Busch
ATTORNEY

July 19, 1960 W. BUNKER 2,945,547
ENGINE AND VEHICLE SPEED CONTROL GOVERNOR
Filed June 12, 1957 2 Sheets-Sheet 2

INVENTOR
Ward Bunker
BY
ATTORNEY

United States Patent Office 2,945,547
Patented July 19, 1960

2,945,547

ENGINE AND VEHICLE SPEED CONTROL GOVERNOR

Ward Bunker, Dayton, Ohio, assignor to General Motors Corporation, Detroit, Mich., a corporation of Delaware Filed June 12, 1957, Ser. No. 665,165

3 Claims. (Cl. 180—82.1)

The invention relates to a governor system for an automotive vehicle which provides a maximum speed to which the vehicle may be governed and a maximum speed to which the engine driving the vehicle may be governed. Features of the invention include control of the power delivered by an engine in a vehicle as a limitation of maximum vehicle speed with simultaneous maximum limitation on speed of the engine.

The governor system permits limitation of maximum vehicle speed with no limit on the deliverable power of the vehicle engine when the vehicle is below the maximum predetermined vehicle speed and simultaneously permits limitation of maximum engine speed with no limit on the deliverable power of the engine when the engine is below the maximum predetermined engine speed.

The invention includes a single self-contained governor unit which limits the speed of the vehicle without affecting the engine horsepower and at the same time prohibits the engine from attaining dangerous overspeeds in lower gear ratios. A governor embodying the invention will therefore replace the need for two governors, one for engine speed and one for vehicle road speed, on automotive vehicles.

Figure 1:
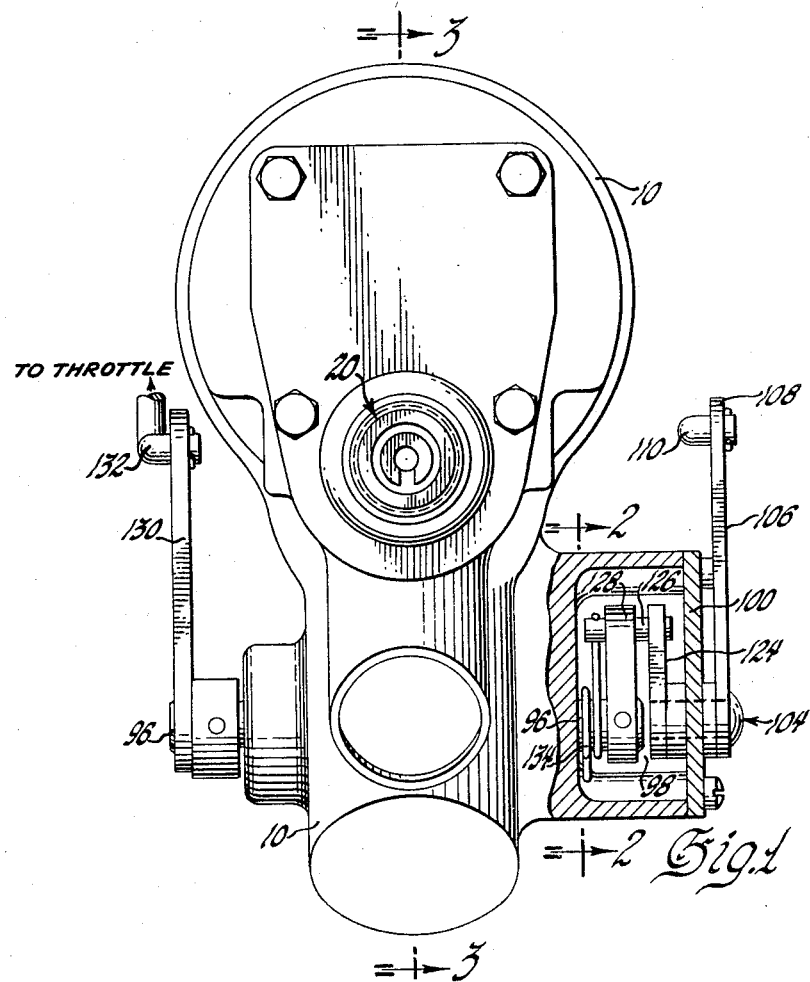
Figure 1 illustrates a governor embodying the invention and having parts broken away and in section.

The governor unit includes a casing 10 in which a shaft 12 is rotatably mounted and supported in bearings 14 and 16. A flexible drive coupling 18, to which a flexible drive shaft may be connected from the output shaft of the vehicle transmission, is provided on one side of the casing 10. A flexible drive coupling 20, which may be connected by a flexible drive shaft leading from the camshaft of an engine mounted in the vehicle in which the governor is to be used, is provided on another side of the casing 10. A third flexible drive coupling 22 may be provided adjacent coupling 18 and generally parallel thereto. A flexible drive shaft may connect this coupling with the vehicle speedometer.

The driving force from coupling 18 is transmitted to shaft 12 through overrunning clutch 24. The driving force from coupling 20 is transmitted to shaft 12 through spur gears 26 and 28 and overrunning clutch 30. A speed sensitive governor mechanism 32 is mounted on shaft 12 and driven by that shaft. Governor mechanism 32 includes a floating governor disk 34 and a drive spider 36 which are mounted on the shaft 12 so as to receive governor balls 38 within the openings provided by the spider. A cup 40 is provided and formed to restrict the outward movement of the governor balls 38 within the spider and is slidably movable along shaft 12 by the outward movement of the balls resulting from centrifugal force exerted when shaft 12 is rotated.

A sleeve bearing 42 is rotatably mounted on the sleeve mounting hub 44 which may be integrally formed with cup 40. Bearing 42 is engageable with a yoke 46 which is pivotally mounted on transversely disposed support shaft 48. Yoke 46 forms one arm of a lever 50 which has another arm extending beyond shaft 48 and provided with an aperture 52 through which one end of a spring 54 may be secured. A suitable adjusting mechanism 56 for spring 54 may be provided. This adjusting mechanism may be preset and sealed or may be externally adjustable by the operator of the vehicle at will. The desired accessibility of the adjusting mechanism will depend upon individual requirements.

The arm 58, in which aperture 52 is formed, extends beyond that aperture and has a pivotal connection 60 at its outer end 62 to which a control valve 64 is secured. Control valve 64 acts as a pivot valve for power piston 66 which is reciprocably positioned within a cylinder formed in a portion of the casing 10. Piston 66 may be provided with an annular passage 68 formed as a groove between lands on the piston. Passage 68 is adapted to communicate at all times with inlet port 70 in casing 10. Port 70 is connected to the oil pump of the vehicle engine or some other source of fluid under pressure. Passage 68 is also connected to a radial passage 72 formed in piston 66. The inner end of radial passage 72 communicates with an annular port 74 formed as a groove between a pair of lands on control valve 64. A second radial passage 76 is provided in piston 66 which is spaced axially from radial passage 72 and operatively communicates with the chamber 78 formed by the end of piston 66 and a portion of casing 10. Axially disposed passage 80 provides fluid communication between radial passage 76 and chamber 78.

When control valve 64 moves outwardly of power piston 66, the annular port 74 will communicate with the radial passage 76 and the axially disposed passage 80 will supply fluid under pressure to chamber 78. This pressure will act on the end of piston 66 to move that piston outwardly as control valve 64 moves outwardly. Control valve 64 is provided with a second annular port 82 which is adjacent the outer end of the valve and will connect port 76 to exhaust when piston 66 moves outwardly beyond the place where it cuts off fluid communication between annular port 74 and radial passage 76. The port 82 also communicates with an axial passage 84 formed in control valve 64 and terminates in the chamber 86 formed by the inner end of valve 64 and the plug 88 which closes the end of the control valve passage 90 in piston 66. Passage 84 maintains the chamber 86 at exhaust pressure at all times so that valve 64 may be easily moved without fluid pressure resistance. Port 82 is always in communication with the interior of casing 10.

When piston 66 moves outwardly with control valve 64, the outer end of the piston may engage yoke 94, the ends of which are disposed on opposite sides of the outer end 62 of control valve 64. Yoke 94 extends radially from and is secured to a shaft 96 which is transversely disposed within casing 10 and is parallel to shaft 48.

One end of shaft 96 projects through an interior wall of casing 10 and into chamber 98. A crank lever 104 may be pivotally mounted in the outer wall 100 which closes chamber 98 and is preferably in axial alignment with shaft 96. Lever 104 includes an arm 106 which is positioned outside casing 10. Arm end 108 of arm 106 may be pivotally secured to one end of accelerator rod 110. The other end of rod 110 may be pivotally connected at 112 to one arm of a suitable bell crank 114. Crank 114 may be pivotally attached to a portion of the vehicle frame at 116. An accelerator idle spring 118 may be secured to an intermediate portion of one of the arms of the bell crank 114 and to the vehicle frame. Spring 118 opposes movement of the vehicle accelerator pedal toward the open throttle position. Rod 120 may be connected to another arm of bell crank 114 and actuated by accelerator pedal 122. Arm 124 of crank lever 104 is positioned within chamber 98 to arcuately engage a laterally extending pin 126 which projects into its path of movement and is supported by arm 128. This arm is secured for rotation with shaft 96 adjacent the end of that shaft which projects into chamber 98.

The other end of shaft 96 projects through the opposite side of casing 10 and has lever 130 secured for rotation on that end. Lever 130 may be pivotally connected by rod 132 to the engine throttle. Arcuate movement of lever 130 will therefore control the position of the engine throttle. A torsion spring 134 may be positioned about shaft 96 adjacent arm 128. One end of the spring may engage a portion of the casing 10 for reaction and the other end may be engagement with one end of pin 126 to bias arms 128 and 130 and shaft 96 toward an open throttle position. The biasing force of spring 134 tends to hold pin 126 against arm 124.

When the flexible drive shaft from the vehicle transmission output shaft rotates flexible coupling 18, spur gear 140 is also rotated. This gear is in mesh with spur gear 142 which is attached to the rotatable portion of coupling 22. Gears 140 and 142 provide a 1:1 gear drive ratio so that the speedometer cable attached to coupling 22 is driven at the same speed as the output shaft cable attached to coupling 18. Gear 140 positively drives gear 142 at all times since gear 140 is positioned intermediate coupling 18 and overrunning clutch 24. Gear 26, which is driven by the rotatable portion of coupling 20 is in mesh with gear 28 which drives the outer portion of overrunning clutch 30. These gears may provide a 2:1 reduction ratio from coupling 20 to clutch 30. Other ratios may be used as required, consideration being given to the desired operating conditions.

The shaft 12 is driven through either of the overrunning clutches, the clutch which is being driven the faster always transmitting the drive force. If, for example, the spring 54 is adjusted for a setting of 1,000 revolutions per minute of the shaft 12 and governor mechanism 32, this speed of rotation may be equivalent to sixty miles per hour vehicle road speed and 2,000 revolutions per minute at coupling 20. Since the rotatable portion of coupling 20 is driven from the engine cam shaft, this speed adjustment of spring 54 is equivalent to 4,000 engine revolutions per minute. Therefore, the governor mechanism 32 regulates the linkage actuating the engine throttle through the servo including power piston 66 and the linkage including shaft 96, lever 130, and rod 132. By utilizing this arrangement of overruning clutch drive, the governor will take over control of the vehicle engine at the preset vehicle road speed, sixty miles per hour in the above example, or at the preset engine speed, 4,000 revolutions per minute in the above example, depending upon the condition first attained.

Figure 4:
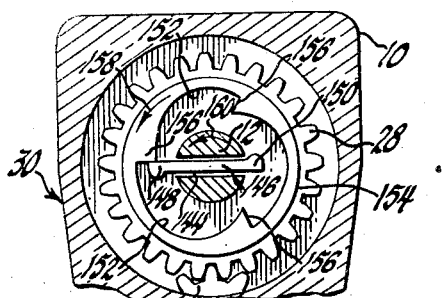
Figure 4 is a fragmentary cross section view showing an overrunning clutch which forms a part of the governor unit and is taken in the direction of arrows 4—4 on Figure 3.

Details of the overrunning clutches are shown in the view of overrunning clutch 30 of Figure 4. Since overrunning clutch 24 is of similar construction, only one clutch will be described. The portion of shaft 12 adjacent the overrunning clutch is provided with a diametrically extending slot 144 through which a slidable key 146 is received. The ends 148 and 150 of key 146 are rounded on one side to provide a smoother camming action. The rounded ends extend circumferentially in the same direction. Axially extending radially cammed surfaces 152 are formed on the internal surface of cylinder 154. This cylinder may be integrally formed or attached to gear 28. Each of the cam surfaces 152 terminates radially inward with abutments 156 which have flat faces extending in generally radial directions. As may be readily seen in Figure 4, when cylinder 154 rotates in the direction of arrow 158, the end 148 of key 146 is driven by the radial surface of one of the abutments 156, driving shaft 12 in the direction of arrow 160. Should the speed of the flexible shaft connected with coupling 18 exceed the speed of cylinder 154, overrunning clutch 24 will then drive shaft 12 and the rounded key ends 148 of overruning clutch 30 will then egage cam surfaces 152 and permit shaft 12 to be driven in the direction of arrow 160 at a greater rate of speed than that at which cylinder 154 is driven.

Figure 2:
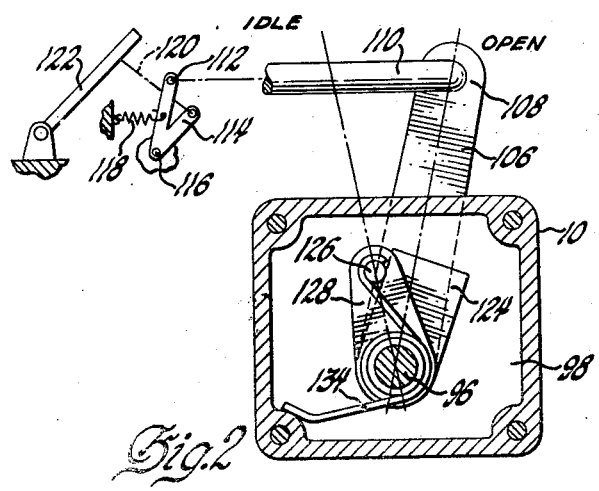
Figure 2 is a partial section view of a portion of the governor of Figure 1 taken in the direction of arrows 2—2 of Figure 1.
Figure 3:
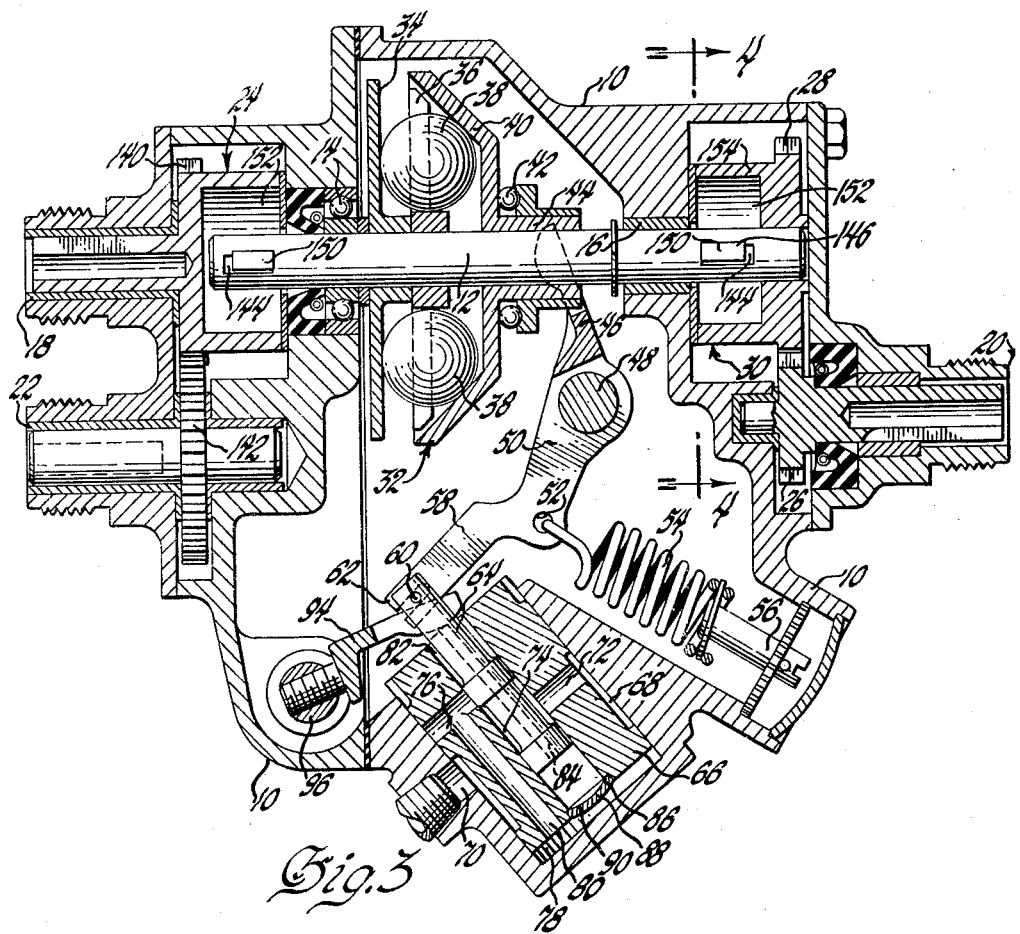
Figure 3 is a cross section view of the governor in Figure 1 taken in the direction of arrows 3—3 of Figure 1.

To accelerate a vehicle from a standing start, the operator depresses the accelerator pedal 122 to any desired extent. This movement acts through rod 120, arm 114, and rod 110 to rotate arm 106 clockwise as viewed in Figure 2 and will tend to rotate arm 124 away from pin 126. Since the throttle linkage had been in an idle position, yoke 94 is at this time in the idle position rather than the full throttle position illustrated in Figure 3. Spring 134 will move pin 126 and arm 128 with arm 124 and spring 134 is thus permitted to open the throttle to an open position corresponding to the position of the accelerator pedal. This movement is transmitted from shaft 96 through lever 130 and rod 132 to the engine throttle. The power piston 66 and the control valve 64 will remain in the position shown in Figure 3 since spring 54 tends to hold control valve 64 in its innermost position until the speed of the vehicle or the speed of the engine increases to the preset maximum vehicle or engine speed. When either of these preset speeds is reached, the centrifugal force resulting from the rotation of balls 38 will move yoke 46 and rotate arm 58 about shaft 48. Control valve 64 will then be moved upwardly and to the left as shown in Figure 3. Annular port 74 will then open to supply fluid under pressure from port 70 through annular passage 68 and radial passage 72 to radial passage 76 and axially disposed passage 80, thereby causing power piston 66 to move and follow control valve 64. When power piston 66 moves far enough relative to control valve 64 to close port 74 from port 76 and passage 80, further movement of the power piston will cease. This movement ceases because the pressure on the end of piston 66 in chamber 78 will be relieved by communication between passages 76 and 80 and exhaust port 82. As power piston 66 moves outwardly to the upper left, as shown in Figure 3, it will rotate yoke 94 in a counterclockwise direction, thereby moving pin 126 in a counterclockwise direction as seen in Figure 2. This movement of pin 126 tends to disconnect the connection between arm 124 and the pin, and shaft 96 is rotated counterclockwise carrying with it lever 130 and throttle rod 132 to move the engine throttle toward the idle position.

As the speed of the engine or vehicle which actuated the mechanism falls below the preset maximum speed, the governor balls 28 will move inwardly to a slight extent, thereby rotating yoke 46 in a counterclockwise direction as seen in Figure 3 to move control valve 64 into power piston 66. Exhaust port 82 is thus opened to passages 76 and 80, allowing the fluid trapped in chamber 78 to escape to exhaust. Spring 134 will tend to hold yoke 94 in engagement with power piston 66 and move that piston inwardly until pin 126 engages arm 124.

A governor mechanism has thus been provided which permits control of the maximum vehicle speed as well as control of the maximum engine speed by the use of a single governor mechanism.

What is claimed is:

1. In a vehicle driven by an internal combustion engine having a throttle, an engine speed control for said throttle comprising speed sensitive means and a source of pressure and a servomotor connected therewith and operable to move said throttle toward the closed position, said servomotor including a power piston and a power piston control valve received within and carried by said piston, said speed sensitive means including one speed sensitive member and a plurality of speed sensitive member independent drive means including first drive means sensitive to vehicle speed and second drive means sensitive to engine speed, means interconnecting said drive means to said speed sensitive member so that only the fastest one of said drive means is driving said speed sensitive member, means connecting said speed sensitive member with said control valve and responsive to said speed sensitive member to cause said power piston to be energized to move said throttle toward the closed position when either a predetermined vehicle speed or a predetermined engine speed is exceeded until the effective speed of the one of the plurality of said drive means is reduced below the one of two said predetermine speeds being exceeded.

2. In a governor mechanism having two inputs and an output and a power take-off responsive to one of said inputs, speed responsive centrifugal means, a drive shaft for said means extending axially therethrough, first one-way clutch means on one end of said shaft and second one-way clutch means on the other end of said shaft, each of said clutch means having an independently driven input member with said shaft being a common output member for driving said centrifugal means whereby the faster of said input members drives said shaft through one of said clutch means while the other of said clutch means free-wheels, said first clutch means input member having an integral power take-off and a driving element geared thereto in a first predetermined gear ratio and sensitive to a first control speed, said second clutch means input member having a driving element geared thereto in a second predetermined gear ratio different from said first gear ratio and sensitive to a second control speed.

3. In a governor mechanisms having two inputs and an output and a power take-off responsive to one of said inputs, speed responsive centrifugal means, a drive shaft for said means extending axially therethrough, first one-way clutch means on one end of said shaft and second one-way clutch means on the other end of said shaft, each of said clutch means having an independently driven input member with said shaft being a common output member for driving said centrifugal means whereby the faster of said input members drives said shaft through one of said clutch means while the other of said clutch means free-wheels, said first clutch means input member having an integral power takeoff and a driving element geared thereto in a first predetemined gear ratio and sensitive to vehicle speed, said second clutch means input member having a driving element geared thereto in a second predetermined gear ratio greater than said first gear ratio and sensitive to engine speed.

References Cited in the file of this patent

UNITED STATES PATENTS

| | | |
|---|---|---|
| Re. 21,776 | Hoof | Apr. 22, 1941 |
| 1,078,337 | Douglas | Nov. 11, 1913 |
| 1,128,115 | Douglas | Feb. 9, 1915 |
| 1,822,667 | Proell | Sept. 8, 1931 |
| 1,843,960 | Sticelber | Feb. 9, 1932 |
| 2,594,739 | Davis | Apr. 29, 1952 |
| 2,657,918 | Parker | Nov. 3, 1953 |
| 2,714,880 | Riley | Aug. 9, 1955 |
| 2,788,770 | Folkerts | Apr. 16, 1957 |
| 2,837,060 | Teetor | June 3, 1958 |

UNITED STATES PATENT OFFICE
CERTIFICATE OF CORRECTION

Patent No. 2,945,547                              July 19, 1960

Ward Bunker

It is hereby certified that error appears in the printed specification of the above numbered patent requiring correction and that the said Letters Patent should read as corrected below.

Column 2, line 23, for "pivot" read -- pilot --; column 3, line 26, for "be engagement" read -- be in engagement --; column 5, line 18, for "predetermine" read -- predetermined --; column 6, line 3, for "mechanisms" read -- mechanism --.

Signed and sealed this 31st day of January 1961.

(SEAL)
Attest:

KARL H. AXLINE
Attesting Officer

ROBERT C. WATSON
Commissioner of Patents